(12) United States Patent
Maeda (10) Patent No.: US 6,976,823 B2
(45) Date of Patent: Dec. 20, 2005

(54) WORK INVERTING SYSTEM

(75) Inventor: Tomio Maeda, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 245 days.

(21) Appl. No.: 10/333,742

(22) PCT Filed: Aug. 2, 2001

(86) PCT No.: PCT/JP01/06659

§ 371 (c)(1),
(2), (4) Date: Jan. 28, 2003

(87) PCT Pub. No.: WO02/18106

PCT Pub. Date: Mar. 7, 2002

(65) Prior Publication Data

US 2003/0132562 A1     Jul. 17, 2003

(30) Foreign Application Priority Data

Aug. 4, 2000    (JP) .............................. 2000-237131

(51) Int. Cl.[7] .............................................. B66C 1/00
(52) U.S. Cl. ................................................... 414/759
(58) Field of Search .......................... 414/737, 738, 414/742, 759, 763, 771, 774

(56) References Cited

U.S. PATENT DOCUMENTS 5,374,158 A * 12/1994 Tessier et al. ............... 414/759
6,234,742 B1   5/2001 Rodefeld et al. ............ 414/771

FOREIGN PATENT DOCUMENTS

JP      2-46728     3/1990
JP      11-58283    3/1999

OTHER PUBLICATIONS

English Language Abstract of JP 11-58283.
English Language Abstract of JP 2-46728.

* cited by examiner

Primary Examiner—Richard Ridley
(74) Attorney, Agent, or Firm—Greenblum & Bernstein, P.L.C.

(57) ABSTRACT

A work reversing system is provided which includes a pair of oscillation drive units, an elevation drive unit, an elevation block, and a pair of oscillation levers. The elevation block is moved up and down by an elevation lever of the elevation drive unit, and has fixed thereto a pair of guide plates which each have a guide recess formed therein. Each oscillation lever has a sliding block provided slidably thereon, which has a guide projection sliding in the guide recess. As the elevation block and oscillation levers are activated, the sliding block is moved in a direction defined by the guide recess. A work is caught by one of clamping members attached to the sliding blocks, and the clamping member is elevated and oscillated. The work is then caught by the other clamping member, and the clamping member is oscillated and lowered, so that the work is reversed.

11 Claims, 11 Drawing Sheets

WORK INVERTING SYSTEM

FIELD OF THE INVENTION

The present invention relates to a work reversing system adapted to make an accurate and quick reversal (180 degrees, for example) of a work being processed in a printing machine, inspection equipment, assembling machine or the like, being supplied to such a machine or being removed from the machine.

BACKGROUND ART

Heretofore, there have been proposed many work reversing systems of this type, including a one which takes out a work once from a machine having worked the work, puts the work into a reversing receiver which is to be reversed automatically or manually, and then carries the work back into the machine.

In the conventional reversing system, an air cylinder (rotary actuator) or the like is used in combination to reverse a work.

However, such conventional reversing systems have a problem in that the procedure for taking out a work from a machine having processed the work, reversing it and then returning it into the machine takes a relatively long time. Also, the conventional work reversing systems are disadvantageous in that the air cylinder (rotary actuator) used in combination causes the impossibility of reversing the work quickly.

Accordingly the present invention has a primary object to overcome the above-mentioned drawbacks of the prior art by providing a work reversing system capable of reversing a work smoothly, accurately and stably.

The present invention has another object to provide a work reversing system capable of reversing a work quickly.

The present invention has still another object to provide a work reversing system designed compact for easy installation in a machine or system which processes a work, and durable for an easy maintenance and reduced running costs.

DISCLOSURE OF THE INVENTION (1) The above object can be attained by providing a work reversing system for catching, by clamping means, a work on a carrying table, reversing it and then placing it back onto the carrying table, including:

a fixing base plate; a pair of oscillation drive unit fixed to the fixing base plate and an elevation drive unit; an elevation block mounted on the fixing base plate so as to be moved up and down; a pair of oscillation levers fixed to output shafts of the pair of oscillation drive units, respectively;

each of the drive units incorporating a cam mechanism to activate itself and linking the drive units to each other;

said elevation block adapted to be linked to an elevation lever fixed to an output shaft of the elevation drive unit, and having fixed thereto a pair of guide plates each having a generally circular guide recess;

each of said oscillation levers having a sliding block freely slidable in a direction through the center of oscillation, said sliding block having a guide projection slidable in the guide recess in the elevation block and thus sliding in a direction defined by the guide recess as the elevation block moves up or down and oscillation levers oscillate;

the clamping means being attached to the sliding blocks, respectively, and a work on the carrying table being caught by one of the clamping means, one of the sliding blocks being elevated and oscillated, and then the work caught by the one clamping means being caught by the other clamping means and released from the one clamping means, the other sliding block being oscillated and lowered to place the thus reversed work back onto the carrying table.

In the above work reversing system according to the present invention, the sliding block to which the clamping means to catch the work is elevated, lowered and oscillated by the drive units activated by the cam mechanisms incorporated in the system, particularly, under the oscillation of the oscillation lever and elevation of the elevation block (oscillation and elevation effected under the relation between the guide recess in the guide plate and guide projection of the oscillation block). So these movements can be quick and backlash-free, which assures a smooth and accurate reversal of a work.

Further, the work can be reversed stably, which also assures a quick reversal of a work.

Besides, the work reversing system according to the present invention can be designed compact for easy installation, for example, in a printing machine, inspection equipment, assembling machine or the like or a product line, Thus, it will be contributed to a higher speed of the product line etc. Also, the work reversing system can be designed for a simple construction, high durability, easy maintenance, easy operability and less running costs.

(2) The above work reversing system according to the present invention should desirably be constructed so that, after the one clamping means catches the work on the carrying table, the elevation lever is oscillated by the output shaft of the elevation drive unit, the elevation block and guide plate are elevated and the pair of clamping means are elevated;

the pair of oscillation levers are oscillated by the output shafts of the pair of oscillation drive units until the pair of clamping means are moved to a position where they are horizontally opposite to each other;

the elevation lever is oscillated downward by the output shaft of the elevation drive unit and the elevation block and pair of guide plates are lowered until the pair of clamping means are moved towards each other; and after the work is caught by the other clamping means and released from the one clamping means, the elevation lever is oscillated upward by the output shaft of the elevation drive unit and the elevation block and pair of guide plates are elevated until the pair of clamping means are moved away from each other;

the pair of oscillation levers are oscillated by the output shafts of the pair of oscillation drive units until the pair of clamping means are directed downward; and the elevation lever is oscillated downward by the output shaft of the elevation drive unit, the elevation block and pair of guide plates are lowered, the pair of clamping means are lowered and finally the work this reversed and caught by the other clamping means is placed back onto the carrying plate.

Because of the construction of the work reversing system according to the present invention, the work can be reversed quickly, smoothly and accurately with no backlash. Thus, the work can be reversed more stably, which adds to the speed of work reversal.

(3) In the work reversing system as set forth in (2) above, the elevation block should desirably be installed to the fixing base plate to be movable up and down by means of the elevation guide rails and elevation sliders slidably attached to the elevation guide rails, respectively.

Because of the above construction of the elevation block, the elevation block 15 can be moved up and down stably and smoothly in relation to the fixing base plate 10. Also, the construction can be designed more simple to move the elevation block 15 vertically.

(4) In the work reversing systems as set forth in (1) to (3) above, the transmission shaft of one of the oscillation drive units should desirably be coupled to the input shaft of the other oscillation drive unit by means of a coupling, while the transmission shaft of the other oscillation drive units be linked to the input shaft of the elevation drive unit by means of a pulley and timing belt.

Because of the above construction, the pair of oscillation drive units and elevation drive unit can be linked to each other positively and easily, and they can easily be disposed in any desired positions correspondingly to the dimensions etc. of a work.

(5) In the work reversing systems as set forth in (1) to (3) above, the clamping means should desirably be formed from a suction piece including a fixture formed installable to the sliding block and a suction pad formed to suck any work positively.

Because of the above construction, a work can be caught easily and positively, and the clamping means can be simply designed for easy operability and maintenance.

BEST MODE FOR CARRYING OUT THE INVENTION

The embodiment of the work reversing system according to the present invention will be described in detail herebelow with reference to the accompanying drawings.

The work reversing system according to the present invention is destined to accurately and quickly reverse, through an angle of 180 degrees for example, a work being processed in a printing machine, inspection equipment, assembling machine or the like, being supplied to such a machine or being removed from the machine. The present invention will be described herein concerning an embodiment directed for a work which is a disc-like recording medium such as a CD, CD-ROM, DVD or the like. In the accompanying drawings, the work is indicated with a reference 50. The work reversing system according to the present invention is designed to be installable in a printing machine in which the work 50 having a printing made on one side thereof is reversed through an angle of 180 degrees for printing on the other side thereof.

Roughly speaking, the work reversing system uses clamping means to catch the work 50 placed on an intermittently rotating disc-like carrying table 45, reverse it and then place it back onto the carrying table 45.

As shown in the accompanying drawings, the work reversing system includes mainly a fixing base plate 10 disposed near the carrying table 45, a pair of oscillating drive units A1 and A2 fixed with screws or the like to the right and left of the fixing base plate 10, an elevation drive unit A3 fixed to an upper portion of the oscillation drive unit A2, an elevator body 15 installed to the fixing base plate 10 to be movable up and down, and a pair of oscillating levers 20 fixed, each by a boss 7, to output shafts 1b and 2b, respectively, of the pair of oscillation drive units A1 and A2.

Further, the drive units A1, A2 and A3 are activated and linked to each other, by a cam mechanism incorporated in each of them.

More particularly, the oscillation drive unit A1 is coupled at a transmission shaft 1c thereof to an input shaft 2a of the oscillation drive unit A2 by a coupling 4, and the oscillation drive unit A2 is linked at a transmission shaft 2c thereof to an input shaft 3a of the elevation drive unit A3 by means of a pulley 5, timing belt 6, etc.

The elevation block 15 is linked to the elevation lever 8 fixed to an output shaft 3b of the elevation drive unit A3 to be movable up and down. The elevation block 15 has fixed thereto a pair of guide plates 30 each having a nearly circular recess 31 formed therein. Each of the pair of oscillation levers 20 is provided with a sliding block 25 formed to be freely slidable in a direction through the center of oscillation of the oscillation lever 20. The sliding bock 25 is provided with a guide projection 27 which is slidable in and along the guide recess 31. Thus, as the elevation block 15 moves up and down and the oscillation lever 20 is oscillated, the sliding block 25 is caused to slide in a direction defined by the guide recess 31.

Each of the sliding blocks 25 is provided with the above-mentioned clamping means. The work 50 placed on the carrying table 45 is caught at one side thereof by one of the clamping means, is elevated and oscillated. The work 50 is caught at the other side thereof or received from the one clamping means, oscillated, lowered by the other clamping means, and placed back onto the carrying table 45. The work 50 has thus been reversed when it is placed back on the carrying table 45.

Figure 1:
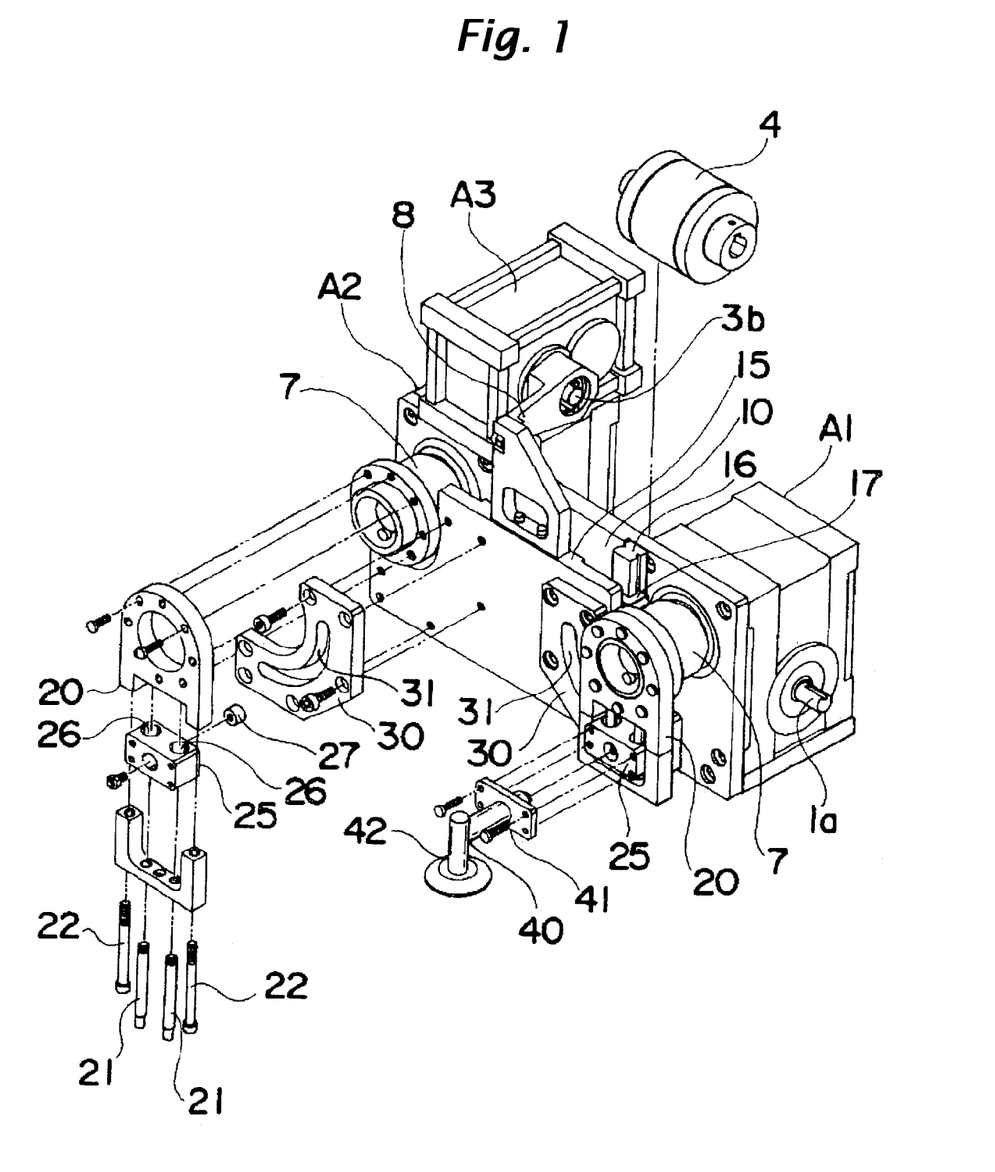
FIG. 1 is an exploded perspective view of a part of an embodiment of the work reversing system according to the present invention.
Figure 2:
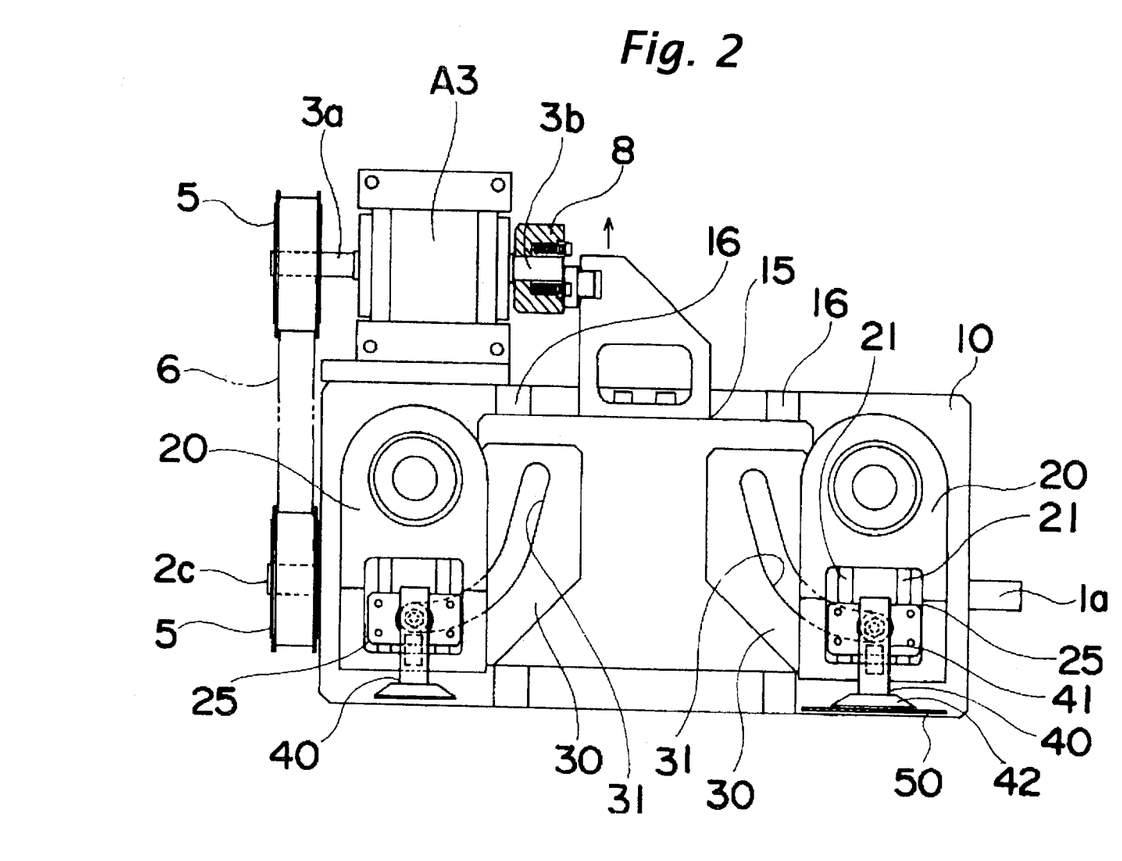
FIGS. 2 to 7 are partially fragmentary front views for explaining the operation of the work reversing system shown in FIG. 1.
Figure 3:
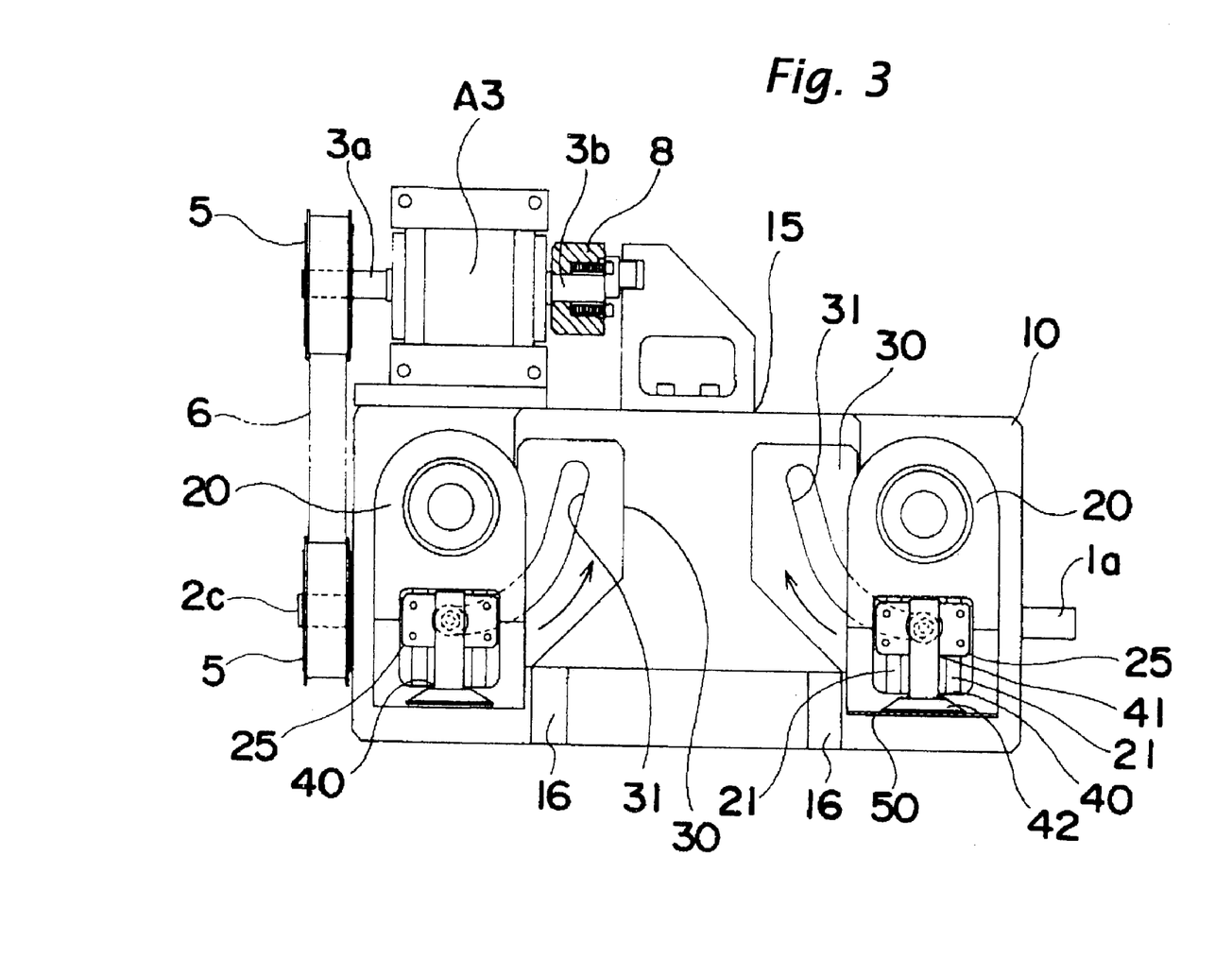

The work reversing system constructed as above according to the present invention acts as will be described herebelow:

(1) Upon catching the work 50 on the carrying table 45 by one of the clamping means (as shown in FIG. 2), the elevation lever 8 is oscillated by the output shaft 3b of the elevation drive unit A3, the elevation block 15 and guide plate 30 are elevated, and the pair of clamping means are thus elevated (as shown in FIG. 3).

Figure 4:
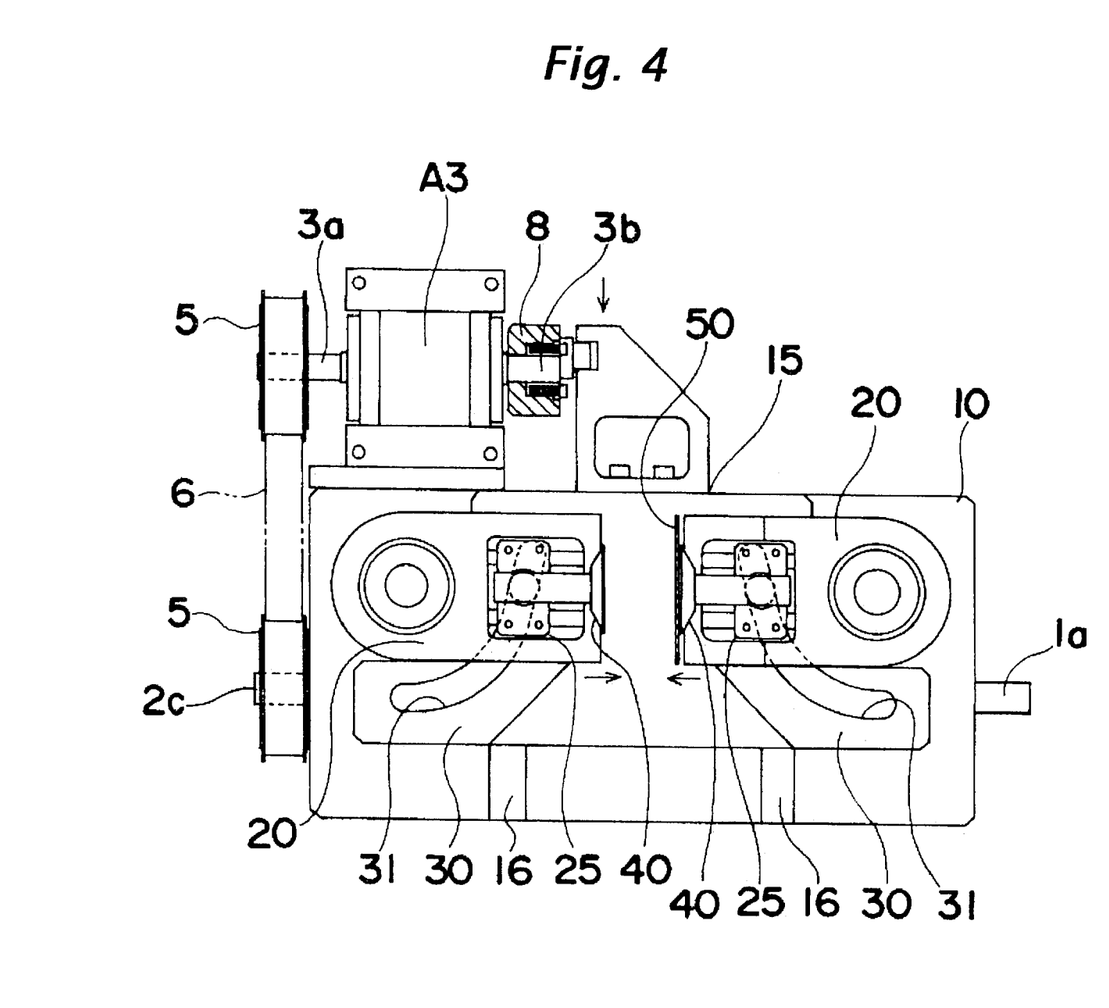

(2) Further, the pair of oscillation levers 20 are oscillated about 90 degrees by the output shafts 1b and 2b of the pair of oscillation drive units A1 and A2 to a position where the pair of clamping means are horizontally opposite to each other (as shown in FIG. 4).

Figure 5:
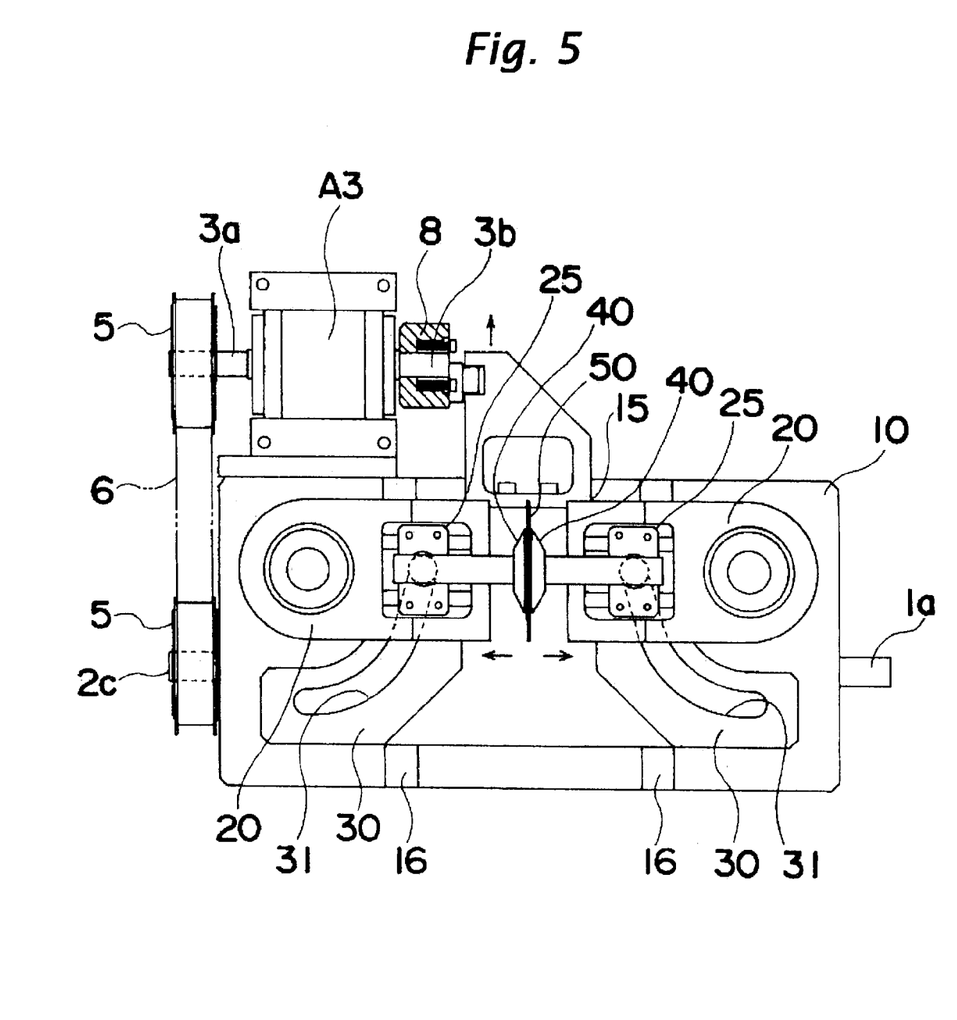

(3) The elevation lever 8 is oscillated downward by the output shaft 3b of the elevation drive unit A3, the elevation block 15 and pair of guide plates 30 are lowered, and thus the pair of clamping means move towards each other (as shown in FIG. 5).

Figure 6:
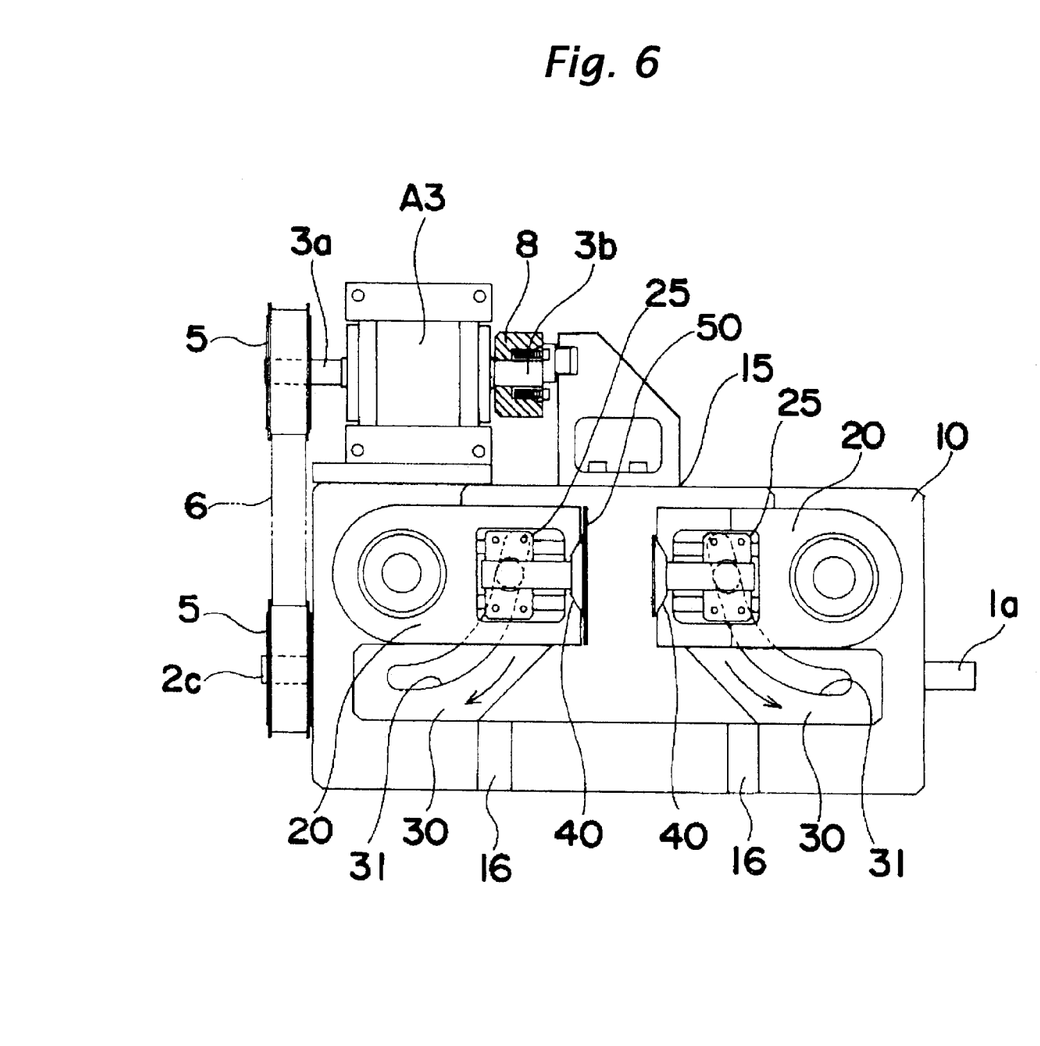

(4) Further, after the work 50 is caught by the other clamping means and released from the one clamping means, the elevation lever 8 is oscillated upward by the output shaft 3b of the elevation drive unit A3, the elevation block 15 and pair of guide plates 30 are elevated, and thus the pair of clamping means move away from each other (as shown in FIG. 6).

Figure 7:
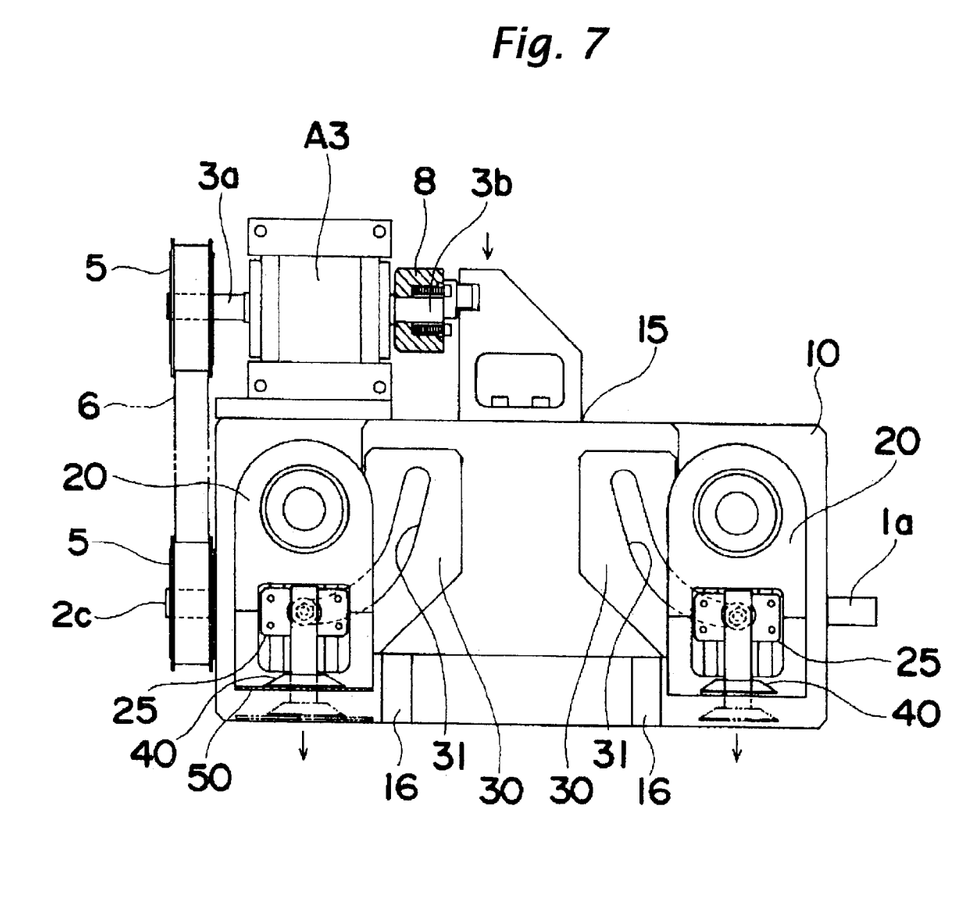
Figure 8:
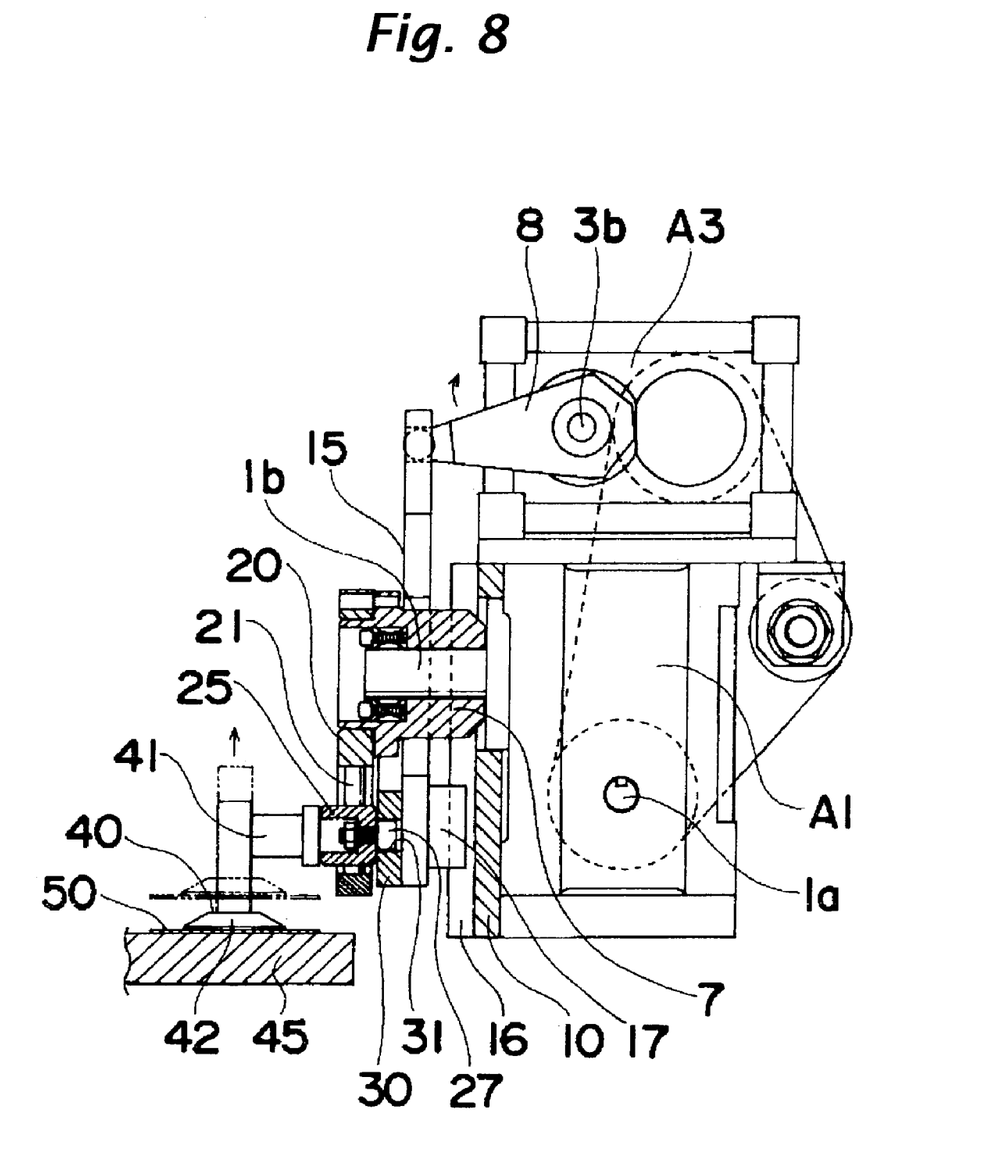
FIGS. 8 and 9 are partially fragmentary right side elevations for explaining the operation of the work reversing system.
Figure 9:
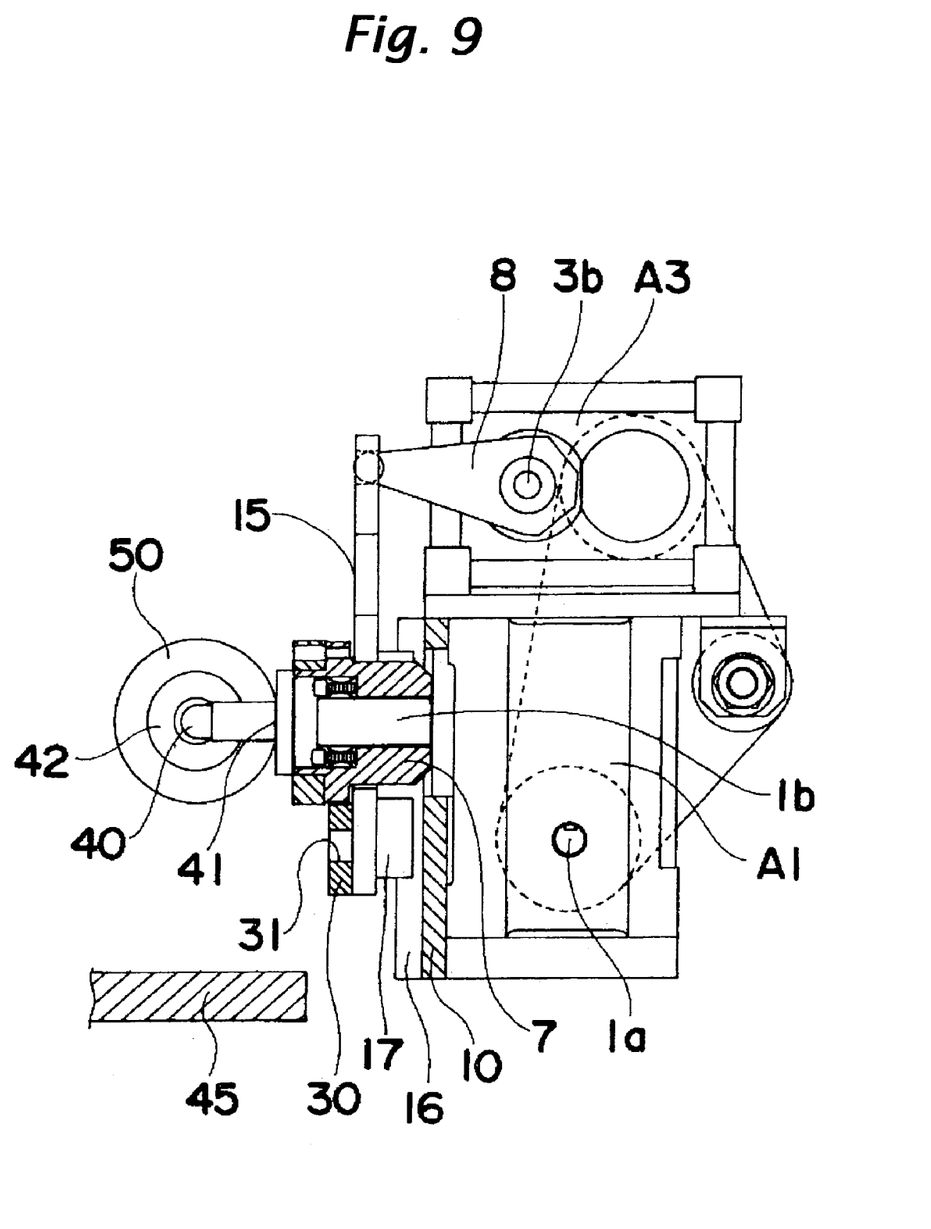
Figure 10:
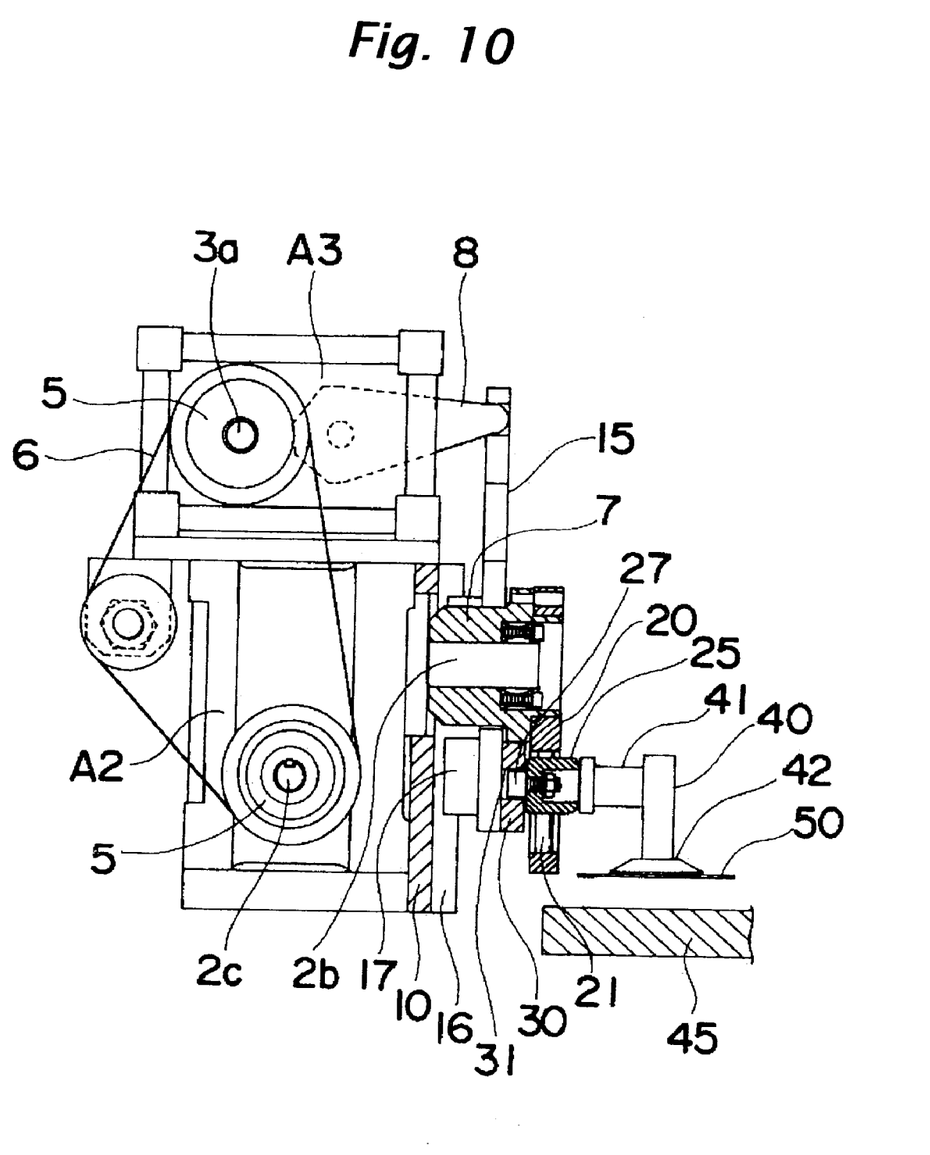
FIG. 10 is a partially fragmentary left side elevation of the work reversing system.
Figure 11:
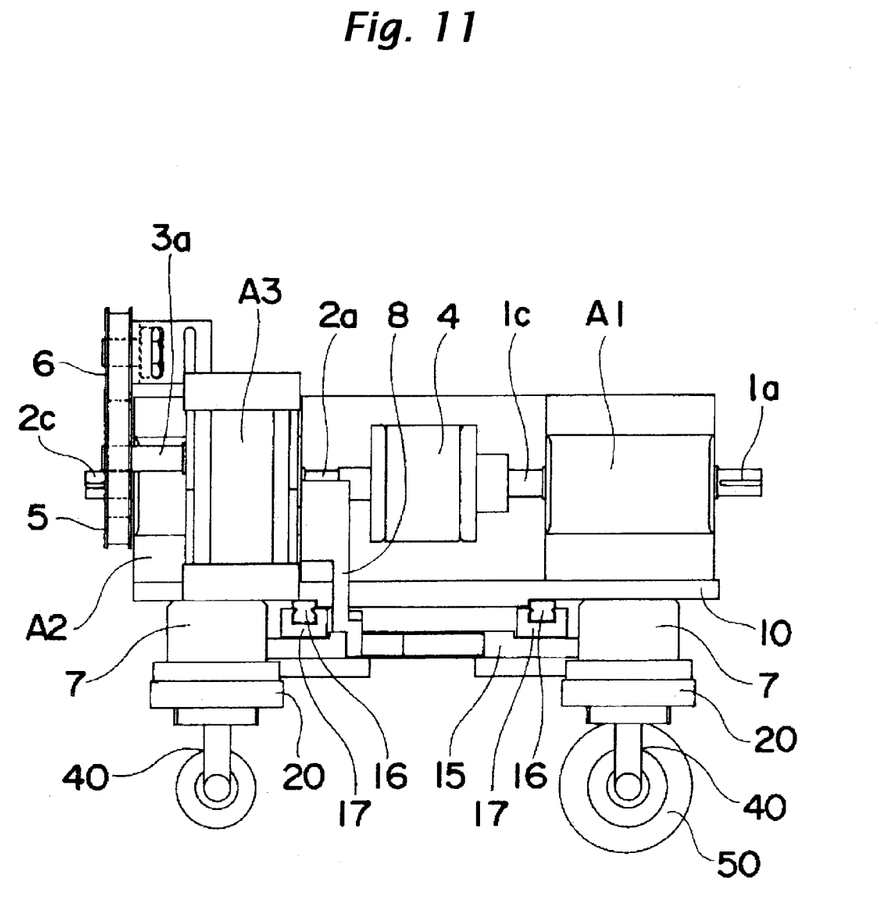
FIG. 11 is a partially fragmentary plan view of the work reversing system.

(5) The pair of oscillation levers 20 is oscillated about 90 degrees by the output shafts 1b and 2b of the pair of oscillation drive units A1 and A2, and the pair of clamping means are directed downward (as shown in FIG. 7).

(6) The elevation lever 8 is oscillated downward by the output shaft 3b of the elevation drive unit A3, the elevation block 15 and pair of guide plates 30 are lowered, the pair of clamping means are lowered, and the work 50 thus reversed and caught by the other clamping means is placed back onto the carrying table 45.

In this embodiment, each of the above clamping means is a suction piece 40. The suction piece 40 includes a fixture 41 attachable to the sliding block 25, and a suction pad 42 formed to freely suck (by vacuum, for example) the work 50, for example.

Each of the pair of oscillation drive units A1 and A2 uses an oscillator or the like. It includes a box-like metallic casing from which the input shafts 1a and 2a, output shafts 1b and 2b, and transmission shafts 1c and 2c are projected and which has provided therein an oscillator cam, grooved cam or ribbed cam. As the input shafts 1a and 2a are continuously rotated, the output shafts 1b and 2b are intermittently rotated forward or backward within a predetermined angle (e.g., 90 degrees).

It should be noted that the transmission shafts 1c and 2c are rotated synchronously with the input shafts 1a and 2a, and the output shafts 1b and 2b of the pair of oscillation drive units A1 and A2 are rotated symmetrically with each other.

The elevation drive unit A3 is an oscillator or the like for example. It includes a box-like metallic casing from which the input shaft 3a and output shaft 3b are projected and which has provided therein an oscillator cam, grooved cam or ribbed cam. As the input shaft 3a is continuously rotated, the output shaft 3b is intermittently rotated forward or backward within a predetermined angle.

Note that the input shaft 3a is rotated by a torque of the transmission shaft 2c of the oscillation drive unit A2, transmitted via the pulley 5, timing belt 6, etc. for example.

The elevation block 15 has a cut formed in the upper end thereof, and it is linked to the elevation lever 8 with a roller provided at the end of the elevation lever 8 fixed to the output shaft 3b of the elevation drive unit A3, being received in the cut in the elevation block 15. Thus, the elevation block 15 is smoothly moved up or down under the oscillation of the elevation lever 8.

Note that the elevation block 15 is attached, movably up and down, to the fixing base plate 10 by means of elevation sliders 17 each slidably attached to an elevation guide rail 16. The elevation guide rails 16 are fixed with fixing screws or the like to the fixing base plate 10 at the front right and left of the latter and in parallel to the latter. The elevation sliders 17 are fixed with fixing screws or the like to the elevation block 15 at the rear right and left and upper and lower portions of the latter.

Further, the elevation guide rail 16 has an appropriate cut formed in the right and left portions thereof. The elevation sliding 17 has a projection fittable in the cut in the elevation guide rail 16. The elevation guide rail 16 and elevation slider 17 slide only vertically, not to be separable and deviate horizontally from each other.

The oscillation lever 20 is fixed with fixing screws or the like to the fixing boss 7 fixed to the output shaft 1b (2b) of the oscillation drive unit A1 (A2). Thus, as the output shaft 1b (2b) is intermittently rotated, the oscillation lever 20 is placed to an upright position (in which it is directed downward as shown in FIGS. 2, 3 and 7) and to a horizontal position (in which it is directed sideways as shown in FIGS. 4, 5 and 6).

Also, the oscillation lever 20 is horizontally divided into two pieces which are coupled with fixing screws 22 to each other. These pieces of the oscillation lever 20 have formed between them a generally rectangular cut in which the sliding block 25 can be slidably received and through which two guide shafts 21 to guide the sliding block 25 are extended in parallel to each other.

The sliding block 25 has the general shape of a rectangular parallelopiped. It has vertically formed therein guide through-holes 26 in which the guide shafts 21 are slidably inserted, and has provided on the back thereof a generally roller-shaped guide projection 27 which can smoothly slide in the guide recess 31 formed in the guide plate 30.

The guide plate 30 is a generally L-shaped one, and symmetrically fixed with fixing screws or the like to the elevation block 15 at the front right and left thereof. The guide plate 30 has formed near the center thereof the generally circular guide recess 31 nearly as wide as the guide projection 27.

Note that the majority of the guide recess 31 forms about a quarter of a circle. It extends generally obliquely upward. That is, the recess portion extending obliquely upward works to move the pair of sliding blocks 25 horizontally towards each other.

As mentioned above, the suction piece 40 includes the fixture 41 to be fixed with fixing screws or the like to the sliding block 25, and the suction pad 42 formed to suck the work 50, for example. With this construction, the suction piece 50 can suck the work 50 positively and quickly.

Also, in the suction piece 40, the suction pad 42 has a base portion formed from an elastic material and incorporates a compression spring or the like. When the suction pad 42 catches the work 50, the suction pad 42 is elastically projectile under the action of the base portion and built-in compression spring. The elasticity provides a buffering and thus the suction pad 42 can catch the work 50 positively.

The carrying table 45 may be a disc-like one which is intermittently rotatable, a belt-like one which is intermittently moved, or any one which has a suitable construction for the intended purpose.

The elements of the work reversing system according to the present invention are not limited in construction, shape, dimensions, material and location to those illustrated in the accompanying drawings and described in the above, and of course the work 50 to be caught by the clamping means is not limited to the disc-like shape as shown.

Further, the work reversing system according to the present invention is not limited to the 180-degree reversal of the work 50 but can reverse the work 50 in a desired angular range.

INDUSTRIAL APPLICABILITY

As having been described in the foregoing, the work reversing system according to the present invention is applicable to various types of machinery such as a printing machine, inspection equipment, assembling machine, etc., and can quickly and accurately reverse a work being worked, being supplied or being removed. Because of the stable work reversal, the work reversing system according to the present invention is usable where a work has to be reversed quickly. According to the present invention, the work reversing system can be designed more compact for easier installation and assembling in a production line or the like, and more durable for an easier maintenance and less running costs.

What is claimed is:

1. A work reversing apparatus for catching a work on a carrying table, reversing the work and placing the work back onto the carrying table, comprising:

a base plate;

a pair of oscillation drive units fixed to the base plate;

an elevation block mounted on the base plate so as to be moved up and down;

an elevation drive unit that elevates and lowers the elevation block;

a pair of oscillation levers fixed to respective output shafts of the pair of oscillation drive units;

a pair of guide plates fixed to the elevation block, each guide plate having a generally circular guide recess;

each oscillation lever having a sliding block freely slidable in a direction through the center of oscillation, the sliding block having a guide projection slidable in the guide recess of the guide plate on the elevation block and thus sliding in a direction defined by the guide recess as the elevation block moves up or down and the oscillation levers oscillate; and a pair of clamping members mounted on the respective sliding blocks, wherein a work on the carrying table is caught by one of the clamping members, and upon operation of the elevation and oscillation drive units, the one clamping member and the other clamping member are elevated and oscillated, and upon further operation of the elevation drive unit, the pair of the clamping members move close to each other and move away from each other to catch the work by the other clamping member, and then upon operation of the elevation and oscillation drive units, the other clamping member and the one clamping member are oscillated and lowered to place the reversed work back onto the carrying table.

2. The apparatus according to claim 1, wherein the elevation block is linked to an elevation lever fixed to an output shaft of the elevation drive unit to be movable up and down;

after the one clamping member catches the work on the carrying table, the elevation lever is oscillated by the output shaft of the elevation drive unit, the elevation block and guide plates are elevated and the pair of clamping members are elevated;

the pair of oscillation levers are oscillated by the output shafts of the pair of oscillation drive units until the pair of clamping members are moved to a position where they are horizontally opposite to each other;

the elevation lever is oscillated downward by the output shaft of the elevation drive unit and the elevation block and pair of guide plates are lowered until the pair of clamping members are moved towards each other;

after the work is caught by the other clamping member and released from the one clamping member, the elevation lever is oscillated upward by the output shaft of the elevation drive unit and the elevation block and pair of guide plates are elevated until the pair of clamping members are moved away from each other; and the pair of oscillation levers are oscillated by the output shafts of the pair of oscillation drive units until the pair of clamping members are directed downward; and the elevation lever is oscillated downward by the output shaft of the elevation drive unit, the elevation block and pair of guide plates are lowered, the pair of clamping members are lowered and finally the work thus reversed and caught by the other clamping member is placed back onto the carrying table.

3. The apparatus according to claim 1, wherein the elevation block is installed to the base plate to be movable up and down by elevation guide rails and elevation sliders slidably attached to the respective elevation guide rails.

4. The apparatus according to claim 1, wherein a transmission shaft of one of the oscillation drive units is coupled to an input shaft of the other oscillation drive unit by a coupling, while a transmission shaft of the other oscillation drive units is linked to an input shaft of the elevation drive unit by a pulley and a timing belt.

5. The apparatus according to claim 1, wherein the clamping members each include a suction piece having a fixture configured to be installed on the sliding block and a suction pad configured to positively grip a work.

6. The apparatus according to claim 2, wherein the elevation block is installed to the base plate to be movable up and down by elevation guide rails and elevation sliders slidably attached to the respective elevation guide rails.

7. The apparatus according to claim 2, wherein a transmission shaft of one of the oscillation drive units is coupled to an input shaft of the other oscillation drive unit by a coupling, while the a transmission shaft of the other oscillation drive units is linked to an input shaft of the elevation drive unit by a pulley and a timing belt.

8. The apparatus according to claim 3, wherein a transmission shaft of one of the oscillation drive units is coupled to an input shaft of the other oscillation drive unit by a coupling, while a transmission shaft of the other oscillation drive units is linked to an input shaft of the elevation drive unit by a pulley and timing belt.

9. The apparatus according to claim 2, wherein the clamping members each include a suction piece having a fixture configured to be installed on the sliding block and a suction pad configured to positively grip a work.

10. The apparatus according to claim 3, wherein the clamping members each include a suction piece having a fixture configured to be installed on the sliding block and a suction pad configured to positively grip a work.

11. The apparatus according to claim 4, wherein the clamping members each include a suction piece having a fixture configured to be installed on the sliding block and a suction pad configured to positively grip a work.

* * * * *

UNITED STATES PATENT AND TRADEMARK OFFICE
CERTIFICATE OF CORRECTION

PATENT NO. : 6,976,823 B2
APPLICATION NO. : 10/333742
DATED : December 20, 2005
INVENTOR(S) : T. Maeda

It is certified that error appears in the above-identified patent and that said Letters Patent is hereby corrected as shown below:

On the cover page and col. 1, line 1 Item (54), Title, "INVERTING" should be ---REVERSING---.

At column 8, line 33 (claim 7, line 4), after "while" delete "the".

Signed and Sealed this

Fifteenth Day of August, 2006

JON W. DUDAS
*Director of the United States Patent and Trademark Office*